United States Patent [19]

Sorbo et al.

[11] Patent Number: 5,330,720
[45] Date of Patent: Jul. 19, 1994

[54] SYSTEM FOR DETECTING FUGITIVE EMISSIONS

[75] Inventors: Nelson W. Sorbo, Canoga Park; John Kert, Santa Monica, both of Calif.

[73] Assignee: Hughes Aircraft Company, Los Angeles, Calif.

[21] Appl. No.: 21,145

[22] Filed: Feb. 23, 1993

[51] Int. Cl.5 .............................. G01M 3/04
[52] U.S. Cl. ...................... 422/98; 422/83; 422/90; 422/93; 422/94; 73/40; 73/46; 73/40.7; 285/93; 285/365; 277/2
[58] Field of Search .................. 422/83, 90, 93, 94, 422/98; 277/2; 285/93, 365; 73/46, 40.7, 40

[56] References Cited

U.S. PATENT DOCUMENTS

| 3,054,617 | 9/1962 | Mueller | 277/2 X |
|---|---|---|---|
| 3,694,734 | 9/1972 | Blackmer | 422/83 X |
| 3,996,789 | 12/1976 | Wilson | 73/40.5 R |
| 4,302,033 | 11/1981 | Evans et al. | 285/14 |
| 4,410,186 | 10/1983 | Pierce | 277/2 |
| 4,424,973 | 1/1984 | Heilala | 277/2 |
| 4,497,493 | 2/1985 | Sall et al. | 277/2 |
| 4,557,139 | 12/1985 | Cantwell et al. | 73/40.7 |
| 4,569,540 | 2/1986 | Beson | 285/93 |
| 4,573,344 | 3/1986 | Ezekoye | 73/46 |
| 4,576,038 | 3/1986 | Dixon et al. | 73/40.7 |
| 4,601,194 | 7/1986 | Miller et al. | 73/40.7 |
| 4,972,867 | 11/1990 | Ruesch | 277/2 X |
| 5,121,929 | 6/1992 | Cobb | 277/2 |

Primary Examiner—James C. Housel
Assistant Examiner—Harold Y. Pyon
Attorney, Agent, or Firm—Elizabeth E. Leitereg; M. W. Sales; W. K. Denson-Low

[57] ABSTRACT

In a system for detecting gaseous emissions (10), a housing (20) encases a mechanical member such as a flanged coupling (21) of a closed mechanical system which contains a fluid such as a gas (11) and receives gas (11) escaping through the flanged coupling (21). A sensor (26) extends through the housing (20) into a cavity (22) formed by the housing (20). A semipermeable membrane (28) forming the union between the sensor (26) and housing (20) allows gas (11) encased by the housing (20) to slowly pass from the housing (20) while preventing foreign matter from entering the housing.

12 Claims, 3 Drawing Sheets

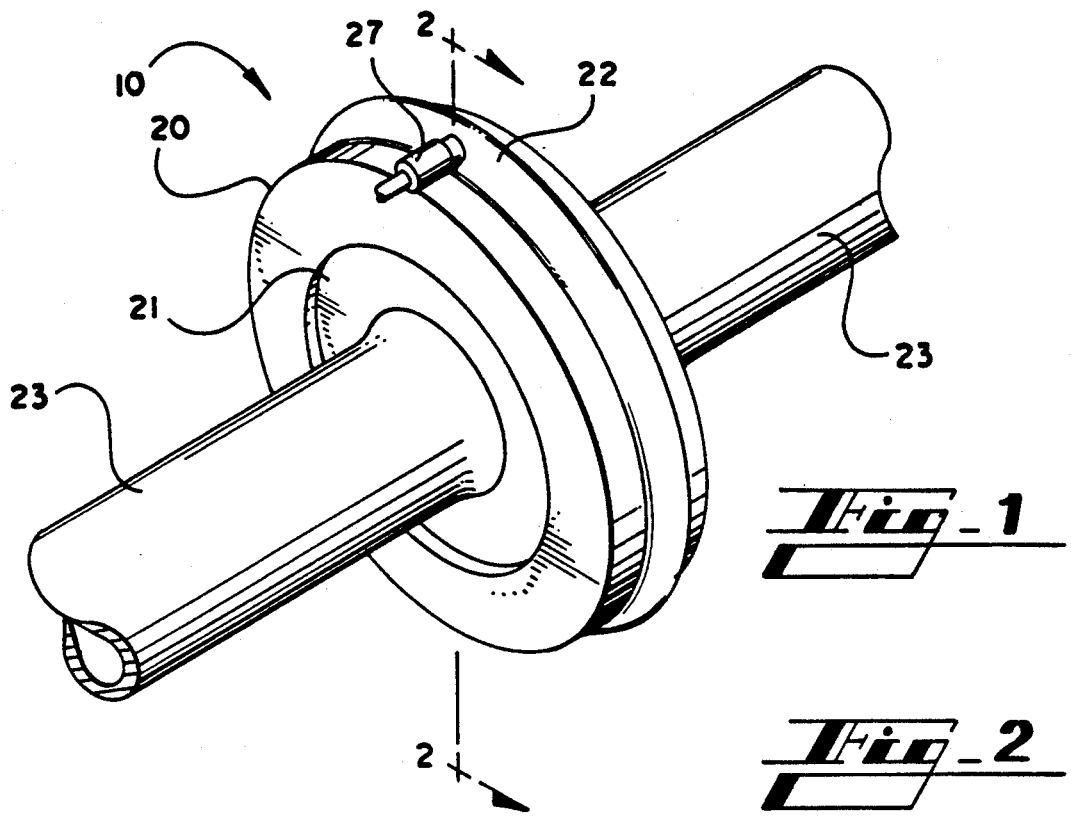
Fig_1
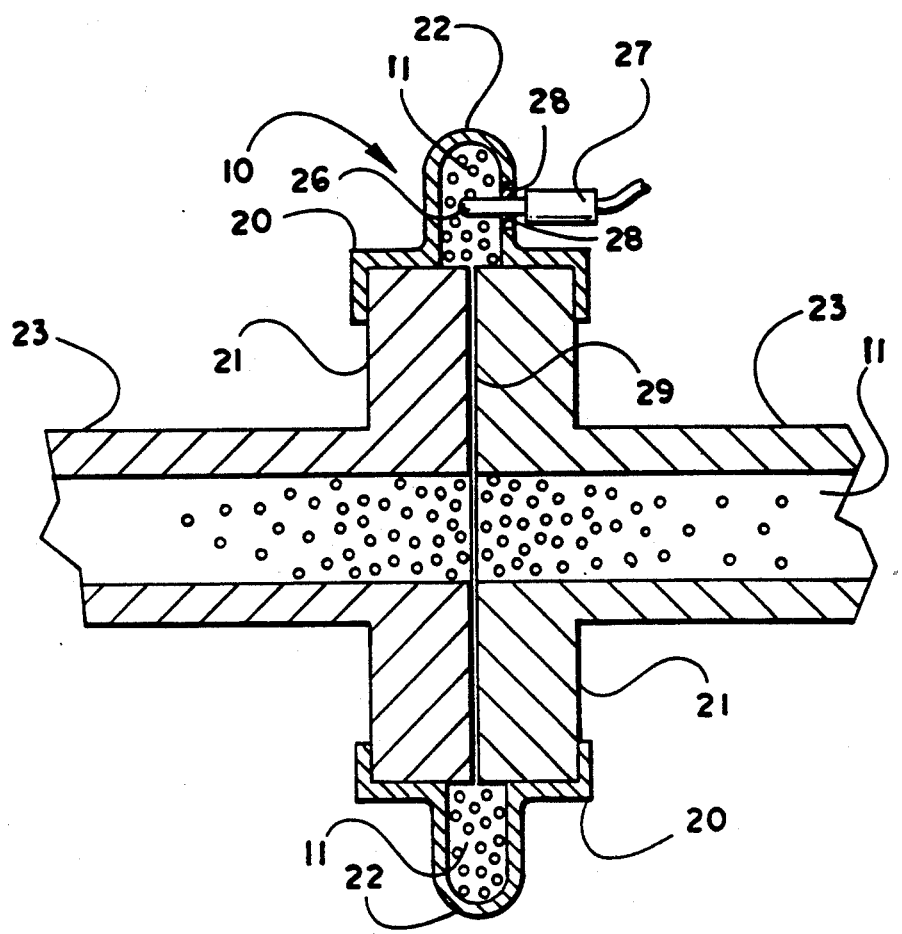
Fig_2

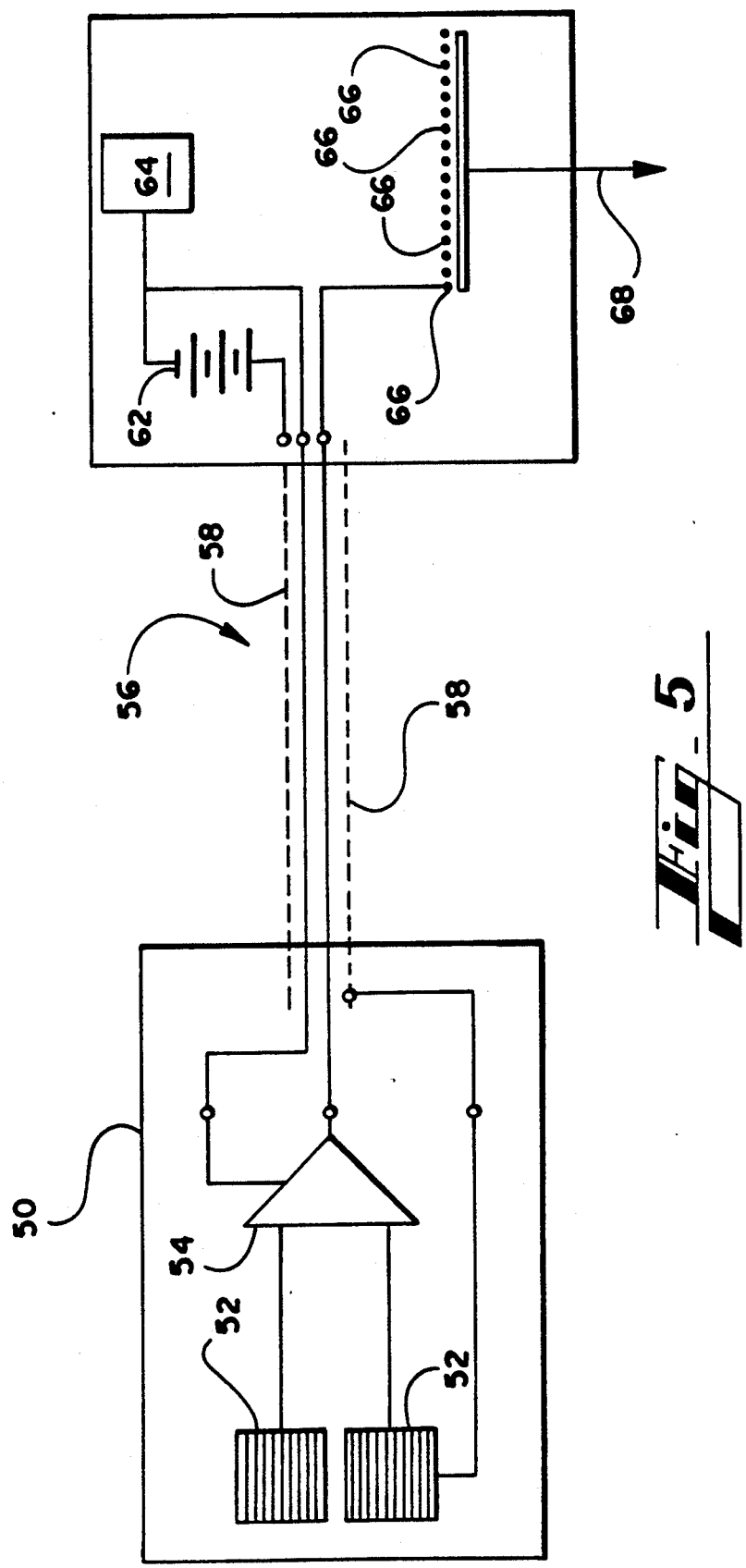

SYSTEM FOR DETECTING FUGITIVE EMISSIONS

TECHNICAL FIELD OF THE INVENTION

The present invention relates to methods for detecting gaseous emissions, and more particularly to a system for automatically detecting fugitive gaseous emissions.

BACKGROUND OF THE INVENTION

Seals are often used to prevent the passage of a gas from the union of coupled elements in a closed mechanical system containing a gas or liquid. Such seals may be used with couplings such as the flanged union of two pipe ends, the union of a valve stem and valve body, or the union of a compressor impeller shaft and compressor housing. Emission of a gas from a seal generally indicates partial or complete failure of the seal. It is important that the integrity of the seal be restored as quickly as possible. A known method of detecting gaseous emissions requires an individual to manually inspect potential emission sources such as valves, flanges, compressors, and other elements of a closed mechanical system. In this manual method of detection, an individual places a hand-held analyzer which measures gas concentrations in close proximity to the potential emission source. Measured concentrations of any detected gas are applied to formulas to estimate the leak rate of the tested item. There is a problem in attempting to use this manual method of detecting gaseous emissions when attempting to monitor so-called "fugitive" emissions. Fugitive emissions are generally considered to be gases emanating from sources that cannot be easily localized, for example, leaks from various types of industrial equipment including valves, flanges, and compressors. The problem in using the above-described manual method of detecting gaseous emissions is that it is impractical, if not impossible, to adequately monitor numerous potential emission sites and/or remote potential emission sites. For example, in a factory there may be hundreds of thousands of seals in flanges and valves requiring monitoring. Also, potential emissions sites may be at locations extremely remote from any monitoring personnel.

SUMMARY OF THE INVENTION

It is an object of the invention to provide a means for automatically detecting gaseous emissions at remote locations.

According to a preferred embodiment of the invention, a housing encases a member, such as a flanged coupling, of a closed mechanical system which contains a gas or liquid. A sensor extends through the housing into a cavity formed by the housing. The opening through which the sensor extends may be fitted with a semipermeable membrane that allows small quantities of gas to slowly pass but prevents foreign matter from entering the housing. The sensor has a component which generates and transmits an electrical signal of a magnitude proportionate to the level of concentration of escaping gas which is detected. The signal is distinctive of the location of the mechanical member encased by the housing. The electrical signal is received at a remote location, enabling the identification of the source and amount of escaping gas.

Other aspects, objects, features, and advantages of the present invention will become apparent to those skilled in the art upon reading the detailed description of preferred embodiments.

BRIEF DESCRIPTION OF THE DRAWINGS

FIG. 1 is an isometric illustration of a system for detecting fugitive emissions according to a preferred embodiment of the invention. The system is shown applied to a flange coupling.

FIG. 2 is a sectional view of the system of FIG. 1 taken along line 2—2 of FIG. 1.

FIG. 5 is a schematic representation of sensor monitoring circuitry for a system for detecting fugitive emissions according to a preferred embodiment of the invention.

DETAILED DESCRIPTION OF PREFERRED EMBODIMENTS OF THE INVENTION

Figure 3:
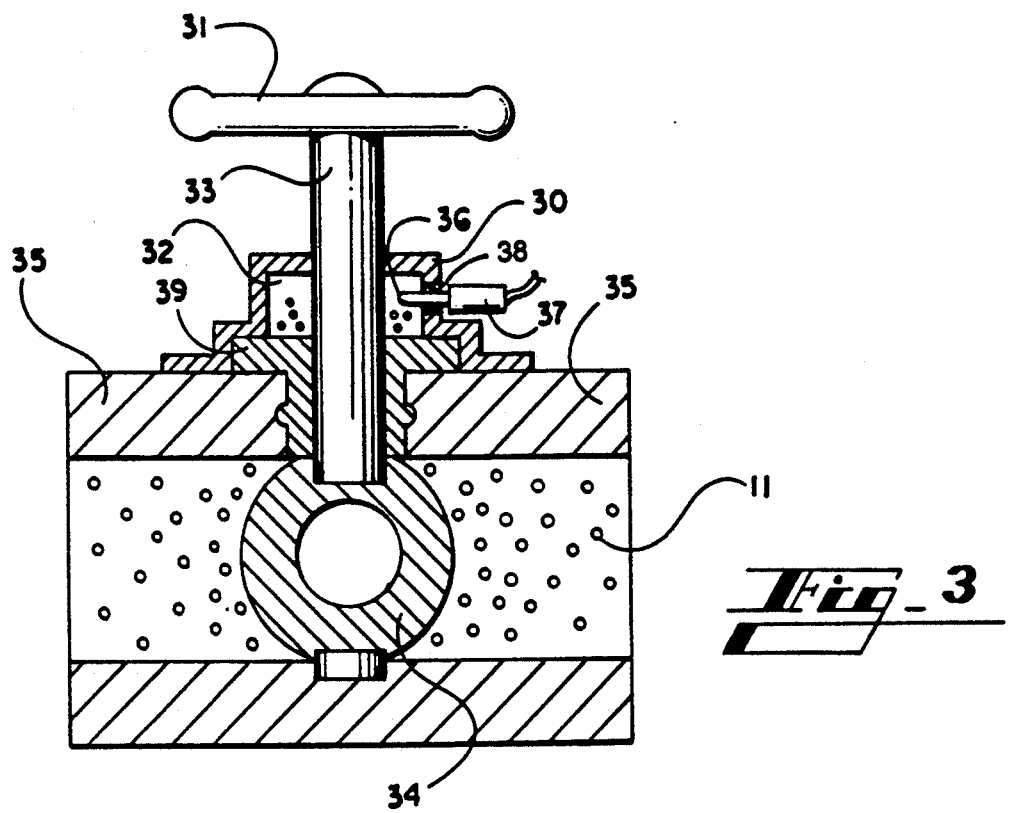
FIG. 3 is a partial sectional illustration of a system for detecting fugitive emissions according to another preferred embodiment of the invention, as applied to a valve coupling.

While the specification concludes with claims particularly pointing out and distinctly claiming the subject matter which is regarded as the present invention, the invention will now be described with reference to the following description of embodiments taken in conjunction with the accompanying drawings. Throughout the drawings, the same reference numerals are used to refer to like features.

The invention detects gaseous emissions escaping from mechanical members of closed mechanical systems which contain gas or liquids. Such mechanical members include flange couplings, a valve stem and a valve seat, and the coupling between a drive shaft and a compressor. In general, the mechanical member is encased in order to channel escaping gaseous emissions to a sensor.

Referring first to FIG. 1, therein is illustrated a system for detecting gaseous emissions 10 according to a preferred embodiment of the invention. The system 10 shown in FIG. 1 is applied to a flange coupling wherein the flanges 21 of two pipes 23 are coupled. The housing 20 of the system 10 encases the joinder of the flanges 21 which is normally sealed. The housing 20 is essentially a boot for a mechanical member. The housing 20 extends outward into a wall to form a cavity 22 for receiving any gas escaping from the joinder of flanges 21. A sensor, protected by a housing or casing 27, extends into the cavity 22 to detect escaping gas or liquid. Referring now also to FIG. 2, which is a sectional view of the system 10 of FIG. 1, therein can be better seen the elements described above as well as additional features of the invention and the mechanical member. The mechanical member is the joinder of the flanges 21 of pipes 23. Normally, when flanges 21 are joined, a seal 29 is placed between the opposing faces to prevent the escape of material carried in the pipeline. FIG. 2 more clearly illustrates the cavity 22 formed by the housing 20 to receive any gas 11 escaping through the seal 29 from the pipeline 23. The system 10 captures escaping gas 11 and causes the escaping gas 11 to contact the sensor 26 extending into the cavity 22. The sensor 26 extends into the cavity 22 of the housing 20. A semipermeable membrane 28 forms the union of the housing 20 and sensor 26. As the cavity 22 fills with escaping gas 11 the semipermeable membrane 28 allows small quantities of gas 11 to slowly flow from the housing 20 near the sensor 26 while not allowing foreign matter to enter the cavity 22 of the housing 20. The slow passage of gas 11 through the semipermeable membrane 28 prevents excessive build-up of pressure within the housing cavity 22 which could damage the system 10 or reduce its integrity. The slow release of gas 11 through the semipermeable membrane 28 also allows for the dissipation of relatively small quantities of gas or liquid which collect over a long period of time due to insignificant leaks. This configuration helps to maintain the reliability and integrity of the system 10.

Referring now to FIG. 3, therein is shown an illustration of a system for detecting fugitive emissions as applied to a valve. A housing 30 encases the union of the valve stem 33 and the valve body 35. The valve stem 33 extends from the valve handle 31 and through the valve body 35 which supports the stem 33 and terminates in an obstructing element (a ball in this illustration) 34. In normal operation, the valve illustrated opens and closes by turning the obstructing ball 34 so that its opening is respectively parallel and perpendicular to the flow of fluid. FIG. 3 shows the ball 34 opening perpendicular to the direction of fluid flow. The coupling of the valve stem 33 and valve body 35 contains a seal 39 for preventing the escape of the fluid running through the valve from escaping. The housing 30 of the system defines a cavity 32 around the coupling of the valve stem 33 and valve body 35 for receiving any gas or liquid 11 escaping through the seal 39. A sensor 36, protected by a housing 37, protrudes into the cavity 32 created by the housing 30. A semipermeable membrane 38 forms the union of the sensor 36 and housing 30. As in the instance of the membrane 28 described above, gas 11 escaping through the seal 39 into the cavity 32 of the housing 30 may slowly pass through the semipermeable membrane 38 and by the sensor 36. As in the above-described embodiment, gases may pass out through the membrane 38 but foreign matter is prevented from entering the cavity 32.

Figure 4:
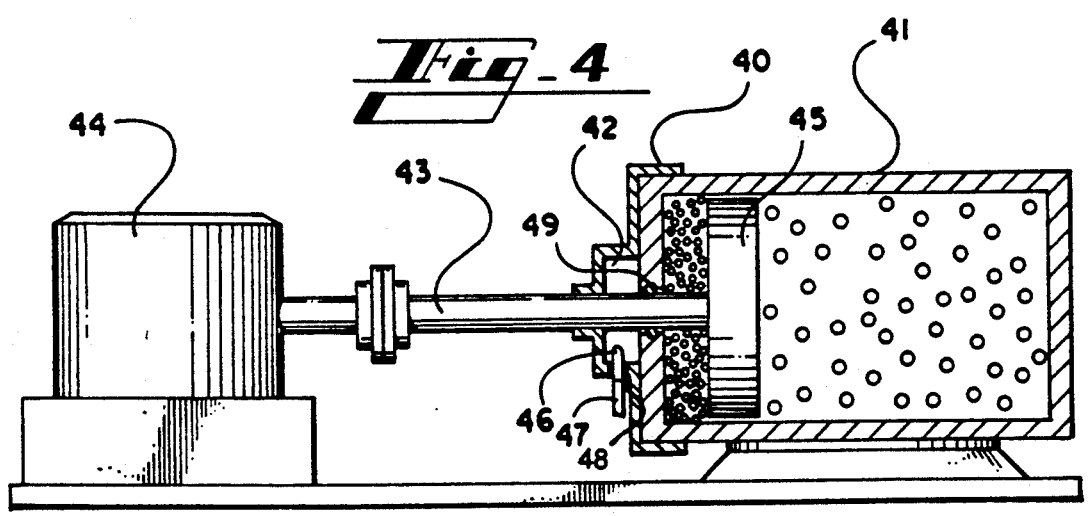
FIG. 4 is a partial sectional illustration of a system for detecting fugitive emissions according to another preferred embodiment of the invention, as applied to a compressor and drive shaft coupling.

Referring now to FIG. 4, therein is illustrated a system for detecting fugitive emissions from a compressor 41. The schematic representation of this preferred embodiment shows a housing 40 encasing the coupling of the drive shaft 43 which turns impeller blades 45 of the compressor 41. The drive shaft 43 and compressor 41 for convenience are shown in sectional view. The drive shaft 43 is driven by a motor 44. The housing 40 defines a cavity 42 for receiving any gas 11 which may escape through the seal 49 between the drive shaft 43 and the compressor 41. As in the previously discussed embodiments, gas or liquid escaping through the seal 49 is captured in the cavity 42 of the housing 40 and contacts the sensor 46. The sensor 46, protected by its housing 47, protrudes into the cavity 42 through a semipermeable membrane 48 which forms the union between the housing 40 and the sensor 46.

The system is useful in detecting leaks of gases from a closed system containing a gas or a liquid from which gases are given off. The nature of gaseous substances causes any gas 11 escaping from the coupled elements of the mechanical members to fill the cavities 22, 32, 42 defined by the respective housings 20, 30, 40. Although the system 10 may be designed to simply detect the escape of a gas, the system 10 is made more functional by indicating the severity of a leak. The severity of a leak is evidenced by the concentration of escaped gas 11 present in the cavity 22, 32, 42. The sensor components, consisting of commonly used gas analyzation elements and algorithms calculate the concentration of escaping gas 11 by measurement of the amount of gas 11 present in the known, or predetermined, volume of the cavity 22, 32, 42. The semipermeable membrane 28, 38, 48 shown in FIG. 2, 3 and 4 allows escaped gas 11 to freely flow, due to its expansive nature, by the sensor 26, 36, 46.

Referring now to FIG. 5, a schematic representation of the sensing electronics of the system 10, when gas 11 reaches the sensor 26, 36, 46, sensor and signal generation electronics 50 detects the escaped gas 11 and generates an electrical signal. In the case of escaping gas, the first stage of the sensor and signal generation electronics 50 is a sensor such as a hydrocarbon or other gas sensor which is capable of sensing gas concentrations in a range such as 1–10,000 parts per million of volume (ppmv). A chemical sensor 52 coupled with a signal generating component 54 transduces the concentration detected according to set parameters into an electrical signal which has a magnitude proportional to the concentration of gas 11 detected. The signal generated is made representative of a particular sensor 26, 36, 46 location. Signal identification can be accomplished by standard signal encoding methods such as the generation of a particular frequency representative of a particular location or by encoding the signal with electronic information indicative of the location. For example, a sensor 26, 36, 46 at a particular location may be made to transmit a signal of a given frequency whose amplitude is proportional to the level of concentration of gas 11 detected.

The signal generated by the sensor electronics may be transmitted to a receiving source by any well-known conventional means. In the preferred embodiment illustrated in FIG. 5, the detecting 52 and signal-generating 54 components are connected to a power component and a transmission component by a shielded cable 56 whose shielding component 58 is a ground connection. In this embodiment, the sensor electronics is powered by a dc voltage source 62. The dc voltage source may be made replenishable by a charger 64 which is at-powered or solar-powered. The charger 64 may be solar-powered when the sensor is placed at a location extremely remote from ac power sources. Solar power may also be used as an alternative in the case of ac power. Although a single sensor may contain all the elements for detecting, transmitting, and powering, the preferred embodiment illustrated shows a manner in which several detecting 52 and signal-generating 54 components may be connected to a single power source and output source. Each detector-signal-generator may tie into a common power source and attach to a terminal 66 of a common output 68 link. Since each signal generated from a particular sensor or has its own characteristics, the use of a common output 68 is possible. Multiple signals may be transmitted simultaneously and decoded at the receiving site. The system 10 is made extremely useful when the output 68 is connectable to multiple signal sources. In a typical situation, there may be multiple mechanical members to be monitored including but not limited to the flange coupling, valve coupling, and compressor coupling described above. For example, a closed mechanical system such as a remote gas pipeline facility may have a series of flange and valve couplings to be monitored. The single output of the electronics can simultaneously carry signals from the multiple emission sites. The composite signal may be transmitted to a remote monitoring facility by means of a direct connection such as fiber optic cable or by radio link. The output 68 may also be connected to a local display such as a light that would be visible to passersby in the vicinity of the system 10.

As should be apparent from the foregoing specification, the invention is susceptible of being modified with various alterations and modifications which may differ from those which have been described in the preceding specification and description. For example, although the invention has been described above with reference to a housing 20, 30, 40, or boot, encasing a mechanical member which is a coupling of some sort, the invention is also applicable to a mechanical member such as a pipe or piping section that may be encased for monitoring a potential leak. Accordingly, the following claims are intended to cover all alterations and modifications which do not depart from the spirit and scope of the invention.

What is claimed is:

1. A system for monitoring a mechanical member of a closed mechanical system for gaseous emissions comprising:
   sensing means for detecting a gas escaping from the mechanical member and for providing a concentration of said gas;
   means for generating and transmitting an electrical signal distinctive of a location of said mechanical member having a magnitude proportionate to a level of said concentration of gas provided by said sensing means;
   a housing for enclosing the mechanical member and for receiving said gas escaping from the mechanical member said housing defining an opening through which said sensing means is received and
   a semi-permeable membrane inserted in said opening of said housing interposed between said opening and said sensing means, wherein said semi-permeable membrane permits said gas to slowly dissipate to exterior said housing and prevents foreign matter from entering interior said housing.

2. The invention of claim 1, said sensing means for detecting a concentration of a gas comprising sensing means for detecting a concentration of a gas in a range of about 1 part per million volume to about 10,000 parts per million volume.

3. The invention of claim 1, said housing defining a cavity of predetermined volume around said mechanical member.

4. The invention of claim 1, further comprising means for receiving the electrical signal generated and transmitted by said sensing means, remote from the location of said mechanical member.

5. The invention of claim 1, the mechanical member comprising a flange coupling.

6. The invention of claim 1, he mechanical member comprising a coupling of a valve stem.

7. The invention of claim 1, the mechanical member comprising a coupling of a drive shaft and a compressor.

8. A system for monitoring a mechanical member of a closed mechanical system for gaseous emissions comprising:
   sensing means for detecting gas escaping from said mechanical member and for generating an electrical signal distinctive of a location of said mechanical member, said electrical signal having a magnitude proportionate to a concentration of said gas in a range of about 1 part per million volume to about 10,000 parts per million volume;
   a housing for enclosing the mechanical member, said housing defining an internal cavity of predetermined volume around said mechanical member, and defining an opening through which said sensing means is received; and
   a semi-permeable membrane inserted in said opening of said housing interposed between said opening and said sensing means for permitting said gas to slowly dissipate to exterior said housing and for preventing foreign matter from entering said internal cavity said housing.

9. The invention of claim 8, further comprising means for receiving the electrical signal generated by said sensing means remote from the location of the mechanical member.

10. The invention of claim 8, the mechanical member comprising a flange coupling.

11. The invention of claim 8, the mechanical member comprising a coupling of a valve stem an valve body.

12. The invention of claim 8, the mechanical member comprising a coupling of a drive shaft and a compressor.

* * * * *